March 4, 1930.    M. EISELE    1,749,475
PNEUMATIC FEEDING DEVICE FOR THRASHERS
Filed Nov. 12, 1928
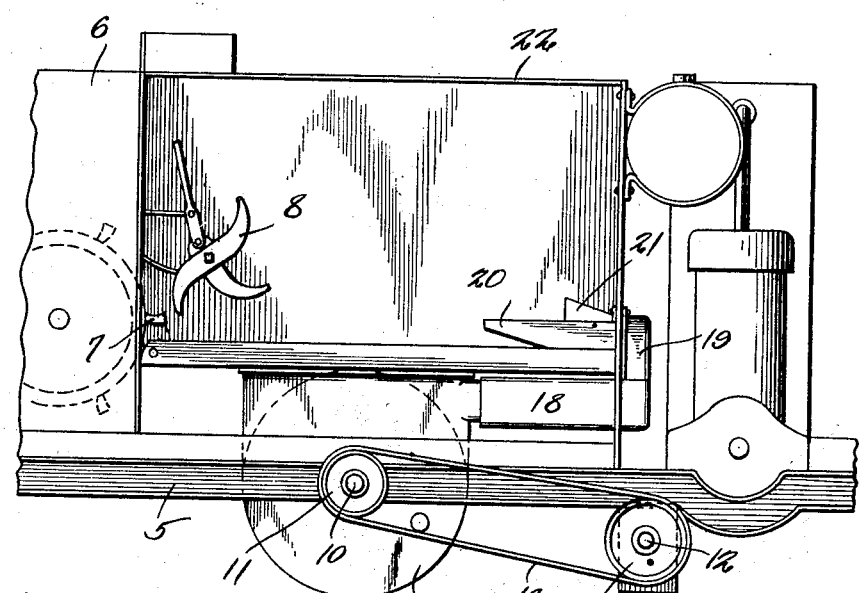
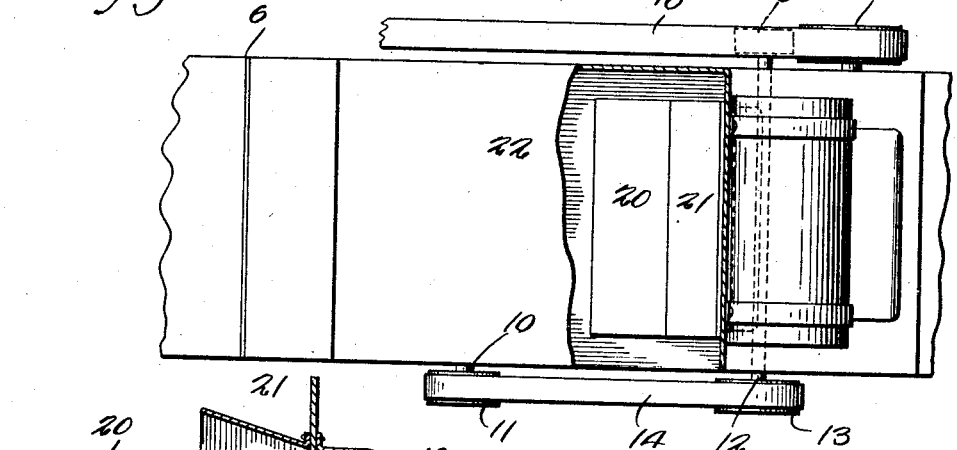
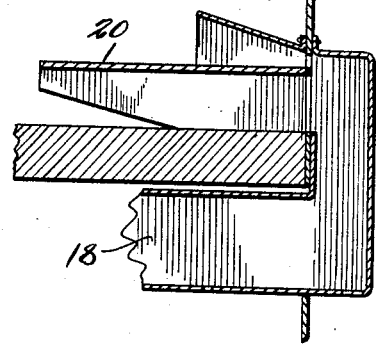
Martin Eisele
Inventor
By C. A. Snow & Co.
Attorneys.

Patented Mar. 4, 1930

1,749,475

UNITED STATES PATENT OFFICE

MARTIN EISELE, OF GRAYMONT, ILLINOIS

PNEUMATIC FEEDING DEVICE FOR THRASHERS

REISSUED

Application filed November 12, 1928. Serial No. 318,836.

This invention relates to an improvement in thrashing machines, including combines and other grain separating machines, and aims to provide means for pneumatically feeding the grain to the machine, thereby eliminating the usual endless belt carriers which are constantly breaking.

Another object of the invention is to provide a feeder which may be regulated to control the quantity of material passing into the thrashing machine, and one which will permit the feeding of green bunches of grain or weeds to the cylinder of the machine, without danger of clogging.

A still further object of the invention is the provision of a feeding device which may be operated with the minimum amount of power, thereby greatly reducing the cost of operation.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view of a thrashing machine equipped with a pneumatic feed.

Figure 2 is a plan view partly broken away.

Figure 3 is an enlarged fragmental sectional view illustrating the construction of the cowl or deflector.

Referring to the drawing in detail, the reference character 5 designates the supporting frame of the thrashing machine to which the body portion of the thrasher indicated at 6, is secured.

The reference character 7 indicates the cylinder teeth that pick up the grain and carry it into the thrasher, while operating over the cylinder teeth are the blades 8 that rotate towards the cylinder in the usual and well known manner to force the feed into the machine, and at the same time cut the bands of bundles of grain.

The device forming the essence of the invention embodies a blower housing 9 in which a blower operates, the blower being mounted on the shaft 10, on which the pulley 11 is secured which pulley 11 receives motion from the shaft 12 through the pulley 13 and belt 14.

This shaft 12 has a pulley 15 mounted on the opposite end thereof which pulley is engaged by the belt 16 that operates over the power pulley 17. Communicating with the blower housing 9 is a laterally extended pipe 18 that has an upwardly extended end portion 19 terminating in a rearwardly extended deflector or cowl 20 that has an inclined forward edge so that material may pass under the cowl.

An auxiliary deflector 21 is positioned on the deflector 20, there being provided an opening in the deflector 20, directly under the deflector 21, so that air will be blown over the top of the deflector 20 to prevent the collection of grain on the upper surface thereof.

From the foregoing it will be seen that bundles of grain are fed into the receiving portion 22 of the thrashing machine, and a blast of air is directed to the material forcing it forwardly to the cutters and cylinders of the machine.

It will also be seen that owing to the construction the material may be fed into the machine with a minimum amount of power, it requiring only sufficient power to rotate the blower, where ordinarily endless conveyors are operated through chains of gearing.

I claim:

1. A thrashing machine including a receiver compartment, a blower casing mounted under the receiver compartment, a main pipe extending along the bottom of the receiver compartment and extending upwardly at one end of the receiver compartment and communicating with the interior of the receiver compartment, a deflector pipe communicating with the first mentioned pipe and extending an appreciable distance within the receiver compartment, and a blower in the blower casing for directing a blast of air through the main pipe and deflector pipe to blow bundles of grain into the machine.

2. A thrashing machine including a receiver compartment, a blower casing under the receiver compartment, a main pipe extending under the receiver compartment and connected with the blower casing to communicate with the receiver compartment, a deflector pipe disposed within the blower casing and communicating with the main pipe, and an auxiliary deflector mounted on the upper surface of the deflector pipe for directing a blast of air to the upper surface of the deflector pipe, and a blower in the blower casing.

In testimony that I claim the foregoing as my own, I have hereto affixed my signature.

MARTIN EISELE.